United States Patent Office 3,468,899
Patented Sept. 23, 1969

3,468,899
THIAZOLE DERIVATIVES
Michael Barber, South Benfleet, David Rex Broad, Romford, and Basil Jason Heywood, Hornchurch, England, assignors to May & Baker Limited, Dagenham, England, a British company
No Drawing. Filed Oct. 28, 1966, Ser. No. 590,181
Claims priority, application Great Britain, Nov. 1, 1965, 46,150/65
Int. Cl. C07d 91/32; A01n 9/12, 9/22
U.S. Cl. 260—306.8                                4 Claims

ABSTRACT OF THE DISCLOSURE 5-halo-2-cyclopropanecarbonamidothiazoles have useful herbicidal properties on pre-emergence application.

---

This invention relates to thiazole derivatives which are of use as herbicides.

As a result of research and experimentation, it has been discovered that certain thiazole derivatives have valuable herbicidal properties. These thiazole derivatives are new compounds of the general formula:

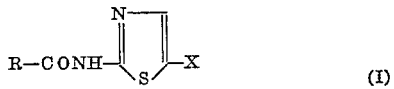

(I)

wherein R represents a cyclopropyl group which may be substituted by one to three substituents selected from methyl and chlorine, or by a methoxy or methylthio group, and X represents a chlorine, bromine or iodine atom.

According to a feature of the present invention, the thiazole derivatives of general Formula I are used to control the growth of weeds, i.e. undesired vegetation. For this purpose, they are normally used in the form of herbicidal compositions, i.e. in association with compatible diluents or carriers suitable for use in herbicidal compositions, for example as hereinafter described.

The thiazole derivatives of general formula I possess herbicidal activity against dicotyledenous, i.e. broadleafed, and monocotyledenous, e.g. grass, weeds on pre- and post-emergence application. By the term "pre-emergence application" is meant application to the soil, in which the weed seeds or seedlings are present, before their emergence above the surface of the soil. By the term "post-emergence application" is meant application to the aerial or exposed parts of the emerged weeds or to the soil in which they are growing. For example, the thiazole derivatives may be used to control the growth of weeds such as Chenopodium spp. including Chenopodium album, and Chenopodium polyspermum, Polygonum spp. including Polygonum lapathifolium, Polygonum aviculare and Polygonum convolvulus, Raphanus, raphanistrum, Sinapis arvensis, Matricaria inodora, Stellaria media, Atriplex patula, Anthemis arvensis, Galeopsis tetrahit, Melandrium album, Thlaspi arvense, Sonchus oleraceus, Amaranthus hybridus, Barbarea vulgaris, Amsinkia intermedia, Fagopyrum tartaricum, Portulaca loeracea, Xanthium spinosum, Alopecurus pratensis, Avena fatua, Poa annua, Festuca pratensis, Holcus lanatus, Eleusine africana, Digitaria sanguinalis, Stetaria viridis, Bromus mollis, Echinochloa crugalli and Lolium perenne by pre- or post-emergence application. The amounts of thiazole derivative or derivatives applied vary with the nature of the weeds, the compositions used, the mode and time of application, and, when used to control the growth of weeds in crop-growing areas, the nature of the crops. In general, taking these factors into account, application rates of from 1 to 4 lbs. per acre give good results, particularly with preferred compounds. It must, however, be understood that higher or lower application rates may be used, depending upon the particularly problem of weed control encountered.

The thiazole derivatives may be used to control the growth of weeds in crop-growing areas by pre- or post-emergence application, and for this purpose are normally applied prior to the planting or sowing of the crop, or, in the case of crops whose seeds are deeply sown and/or which remain dormant for a period sufficiently long to allow the more rapidly developing weeds to be controlled without substantial damage to the crop, prior to the emergence of the crop. Particularly suitable crops are those with large seeds or sets such as maize, peas, dwarf beans and potatoes. In addition, certain crops, including potatoes and cereals, such as wheat and rice, are well tolerant of the thiazole derivatives when applied after they have emerged above the surface of the soil and the herbicides may, therefore, be applied for the control of weeds at this stage of the crop-plants' growth.

The thiazole derivatives may also be used to control, normally in association with compatible diluents or carriers, the growth of undesired vegetation in orchards and plantations by directional application or application during the dormant stage of the crop, and to control the growth of undesired vegetation in fallow or uncultivated land. When used for these purposes, in which a total herbicidal effect is frequently desired, the active compounds are normally applied at dosage rates higher than those used in crop-growing areas. The precise dosage used will depend upon the nature of the vegetation treated and the effect sought.

According to a further feature of the present invention, the thiazole derivatives of general Formula I are used to exercise a desiccant or defoliant effect upon crops such as potatoes, hops, cotton and leguminous seed-crops. For these purposes, the herbicides will normally be applied at application rates higher than those used for weed control.

When used for the control of undesired vegetation, or as crop desiccants or defoliants, the thiazole derivatives may, if desired, be used in association with other herbicidally actve compounds.

Ths invention includes also herbicidal compositions containing one or more thiazole derivatives of general formula I in association with, and preferably homogeneously dispersed in, one or more compatible herbicidally-acieptable diluents or carriers. By the term "compatible herbicidally-acceptable diluents or carriers" is meant diluents or carriers of the type generally accepted in the art as being suitable for use in herbicidal compositions and which are compatible with the thiazole derivatives of general Formula I. The term "homogeneously dispersed" is used to include compositions in which the thiazole derivatives are dissolved in the other components. The term "herbicidal compositions" is used in a broad sense to include not only compositions which are ready to use as herbicides but also concentrates which must be diluted before use. Preferably, the compositions contained from 0.05 to 90% by weight of the thiazole derivatives.

The herbicidal compositions may contain both a diluent or carrier and a surface-active, e.g. wetting, dispersing or emulsifying agent. Surface-active agents which may be present in the herbicidal compositions of the present invention may be of the ionic or non-ionic types, for example sulphoricinoleates, quaternary ammonium derivatives, products based on condensates of ethylene oxide, such as condensates of ethylene oxide with nonyl or octyl phenols, or fatty acid esters of anhydrosorbitols which have been rendered soluble by etherification of the free hydroxy groups by condensation with ethylene oxide, alkali and alkaline earth metal salts of sulphuric acid esters and sulphonic acids such as sodium di-nonyl and di-octyl-sulphosuccinates and alkali and alkaline earth metal salts of high molecular weight sulphonic acid derivatives such as sodium and calcium lignosulphonates. Examples of suitable solid diluents or carriers are aluminium silicate, talc, calcined magnesia, kieselguhr, tri-calcium phosphate, powdered cork, absorbent carbon black and clays such as kaolin and bentonite. The solid compositions, which may take the form of dusts, granules or wettable powders, are preferably prepared by grinding the thiazole derivatives of general Formula I with the solid diluents or by impregnating the solid diluents or carriers with solutions of the thiazoles in volatile solvents, evaporating the solvents and, if necessary, grinding the products so as to obtain powders. Granular formulations may be prepared by absorbing the thiazole derivatives dissolved in volatile solvents onto the solid diluents or carriers in granular form and evaporating the solvents, or by granulating compositions in powder form obtained as described above. Solid herbicidal compositions, particularly wettable powders, may contain wetting or dispersing agents, for example of the type described above, which may also, when solid, serve as diluent or carrier.

Liquid compositions according to the invention may take the form of aqueous, organic or aqueous-organic solutions, suspensions, and emulsions which may incorporate a surface-active, e.g. wetting, dispersing or emulsifying, agent. Suitable liquid diluents for incorporation in the liquid compositions include water, acetophenone, cyclohexanone, isophorone, toluene, xylene and mineral, animal and vegetable oils (and mixtures of these diluents).

Surface-active agents which may be present in the liquid compositions may be ionic or non-ionic, for example of the types described above, and may, when liquid, also serve as diluents or carriers. Thus, liquid diluents or carriers may be, for example, liquids which are other than animal, vegetable and vegetable oils and which contain surface-active agents and animal, vegetable and mineral oils which may contain surface-active agents. When desired, emulsions of the thiazole derivatives may be used in the form of self-emulsifying concentrates containing the active substances dissolved in the emulsifying agents or in solvents containing emulsifying agents compatible with the active substances, the simple addition of water to such concentrates producing compositions ready for use.

Herbicidal compositions according to the present invention may also contain, if desired, conventional adjuvants such as, for example, adhesives, colouring agents and corrosion inhibitors. These adjuvants may also serve as carriers or diluents.

Herbicidal compositions according to the present invention may also comprise the thiazole derivatives of general Formula I in association with, and preferably homogeneously dispersed in, one or more other herbicidally active compounds, and, if desired, one or more compatible herbicidally-acceptable diluents or carriers, surface agents and conventional adjuvants as hereinbefore described.

Examples of other herbicidally active compounds which may be included in, or used in conjunction with, the herbicidal compositions of the present invention include phenoxyalkanoic acids, i.e., γ-(4-chloro-2-methyl-phenoxy)-butyric acid, γ-(2,4-dichlorophenoxy)-butyric acid, 4-chloro-2-methylphenoxyacetic acid, 2,4-dichlorophenoxyacetic acid, α-(4-chloro - 2 - methylphenoxy)-propionic acid and α-(2,4-dichlorophenoxy)propionic acid, benzoic acid derivatives, e.g. 2,3,6-trichlorobenzoic acid, 2-methoxy-3,6-dichlorobenzoic acid and 3-amino-2,5-dichlorobenzoic acid, halogenated aliphatic acids, e.g. trichloroacetic acid and α,α-dichloropropionic acid, carbamates, e.g. isopropyl N-(3-chlorophenyl)-carbamate, isopropyl N-phenylcarbamate, and 3-chlorobut-2-ynyl N-(3-chlorophenyl)carbamate, amides, e.g. 3,4 - dichloropropionanilide, urea derivatives, e.g. N'-(4-chlorophenyl)-N,N-dimethylurea and N,N-dimethyl-N'-phenylurea, diazines, e.g. 5-bromo - 3 - isopropyl-6-methyluracil, triazines, e.g. 2-chloro-4,4-bis-ethylamino-1,3,5-triazine, substituted phenols, e.g. 2-methyl-4,6-dinitrophenol, quaternary ammonium derivatives, e.g. 1,1'-ethylene-2,2'-bipyridylium and 1,1'-dimethyl-4,4'-bipyridylium salts, benzonitrile derivatives, e.g. 2,6-dichlorobenzonitrile and 3,5-diido- and 3,5-dibromo-4-hydroxybenzonitriles and their esters, triazole derivatives, e.g., 3-amino-1,2,4-triazole and benzenesulphonyl carbamates, e.g. methyl 4-aminobenzenesulphonylcarbamate.

Preferred compounds according to the present invention are the thiazole derivatives of Formula I wherein R represents an unsubstituted cyclopropyl group or a cyclopropyl group substituted in the 1-position, preferably by methyl or methoxy. Compounds of particular value are those wherein R represents cyclopropyl or 1-methylcyclopropyl, more especially 5-chloro-2-cyclopropanecarbonamidothiazole, 5-bromo-2-cyclopanecarbonamidothiazole and 5-iodo-2-cyclopropanecarbonamidothiazole, and these compounds and herbicidal compositions containing them and their use, form preferred features of the present invention.

In order to illustrate the valuable and unexpected herbicidal properties of the thiazole derivatives of Formula I, representative results obtained in tests carried out for herbicidal activity are set out in the following Tables I and II, the corresponding results obtained with the closely related compounds of 2-cyclopropanecarbonamidothiazole, and 2-1' - methylcyclopropanecarbonamidothiazole being included for purposes of comparison.

Compounds in Tables I and II are identified as follows.

(i) Compounds of Formula I:

Compound A is 5-chloro-2-cyclopropanecarbonamidothiazole
Compound B is 5-iodo-2-cyclopropanecarbonamidothiazole
Compound C is 5-bromo-2-cyclopropanecarbonamidothiazole
Compound D is 2-1'-methylcyclopropanecarbonamido-5-iodothiazole
Compound E is 2-1'-methylcyclopropanecarbonamido-5-chlorothiazole
Compound F is 2-1'-methylcyclopropanecarbonamido-5-bromothiazole (ii) Comparison compounds:

Compound G is 2-cyclopropanecarbonamidothiazole
Compound H is 2-1'-methylcyclopropanecarbonamidothiazole A. Pre-emergence application The compounds under tests were applied in solution in acetone or as a finely divided suspension in water, at doses corresponding to field application rates of 0.125 or 0.5 to 8 lbs. per acre, to soil containing seeds of a representative range of weed species. The minimum dose producing complete inhibition of the growth of the plants (minimum effective dose) was determined, assessment being carried out 18 to 26 days after treatment.

The results obtained are set out in the following Table I.

TABLE I

| Weed Species | Minimum Effective Dose (lbs./acre) | | | | | | Comparison Compounds | |
| --- | --- | --- | --- | --- | --- | --- | --- | --- |
| | Compounds of Formula I | | | | | | | |
| | A | B | C | D | E | F | G | H |
| Dicotyledons: | | | | | | | | |
| Polygonum lapathifolium | 0.95 | 1.4 | 2.0 | | | | | |
| Sinapis Arvensis | 0.5 | 0.5 | 0.5 | | | | 8 | |
| Matricaria inodora | 0.5 | 0.5 | 0.6 | 0.5–1 | 2 | 8 | 8 | (*) |
| Stellaria media | 0.5 | 0.5 | 0.5 | | | | | |
| Raphanus spp | | | | 4–8 | (*) | 8 | | (*) |
| Monocotyledons: | | | | | | | | |
| Avena fatua | 2.0 | 0.9 | 2.25 | 4.8 | (*) | >8 | (*) | (*) |
| Alopecurus pratensis | 0.5 | 0.5 | 0.75 | 1.0 | 2 | 2–4 | >8 | (*) |
| Festuca pratensis | 0.5 | 0.5 | 1.4 | | | | | |
| Holcus lanatus | 0.5 | 0.5 | 1.1 | | | | | |
| Lolium perenne | 0.6 | 0.5 | 1.3 | | | | | |
| Poa annua | 0.5 | 0.5 | 0.95 | | | | | |
| Application rates (lbs./acre) | 0.5–8 | 0.5–8 | 0.5–8 | 0.125–8 | 0.125–8 | 0.125–8 | 0.125–8 | 0.125–8 |
| Formulation | (¹) | (¹) | (¹) | (²) | (²) | (²) | (²) | (²) |

¹ = Aqueous suspensions.
² = Solution in acetone.
> = Slight herbicidal effect at highest dose applied.
* = No herbicidal effect at highest dose applied.

B. Post-emergence application

The compounds under test were applied in solution in acetone at doses corresponding to field application rates of 0.125 to 8 lbs. per acre to seedlings of a representative range of weed species. The minimum dose producing complete kill of the plants (minimum effective dose) was determined, assessment being carried out 18 to 20 days after treatment.

The results obtained are set out in the following Table II:

TABLE II

| Weed Species | Minimum Effective Dose (lbs./acre) | | | | | | Comparison Compounds | |
| --- | --- | --- | --- | --- | --- | --- | --- | --- |
| | Compounds of Formula I | | | | | | | |
| | A | B | C | D | E | F | G | H |
| Dicotyledons: | | | | | | | | |
| Chenopodium album | 0.5–1 | 0.125 | 0.125 | 0.125 | 0.25 | 0.25 | >8 | 8 |
| Polygonum lapathifoluim | 0.125 | 0.125 | 0.25 | 0.25 | 1–2 | 1–2 | (*) | 8 |
| Sinapis arvensis | 0.25 | 0.125 | 0.125–0.25 | 0.125–0.25 | 1 | 0.25–0.5 | (*) | |
| Matricaria inodora | (*) | 2–4 | 0.5–1 | ))8 | 4 | 4–8 | (*) | (*) |
| Stellaria media | 4–8 | 0.125–0.25 | 0.5 | 0.25 | 1–2 | 1 | (*) | 8 |
| Raphanus sp | | | | 0.25 | | | | 8 |
| Monocotyledons: | | | | | | | | |
| Avena fatua | 2–4 | (*) | 8 | 1–2 | 8 | 2 | (*) | (*) |
| Alopercurus pratensis | 1–2 | 1 | 0.5–1 | | | | | |
| Poa annua | 4–8 | 0.25–0.5 | 0.25–0.5 | 2 | 4–8 | 2–4 | (*) | (*) |

> = Slight herbicidal effect at highest dose applied.
)) = Very slight herbicidal effect at highest dose applied.
* = No herbicidal effect at highest dose applied.

The following example illustrates the herbicidal compositions of the present invention.

EXAMPLE I

A wettable powder is formed from the following:

|   | G. |
| --- | --- |
| 5-iodo-2-cyclopropanecarbonamidothiazole | 25 |
| Texofor F60 (an ethylene oxide/octylphenol condensate) | 10 |
| Celite X205 (finely divided aluminium silicate) | 65 | by dissolving the thiazole derivative in acetone (ca. 1 litre), spraying this solution onto a mixture of the other ingredients in a ribbon-blender and grinding the resultant powder to a suitable fineness. This powder is suspended in water and applied at rates of from 1 to 4 lbs. of thiazole derivative in 30 gallons of water per acre to control Chenopodium spp., including Chenopodium album, and Chenopodium polyspermum, Polygonum spp., including Polygonum lapathifolium, Polygonum aviculare and Polygonum convolvulus, Raphanus raphanistrum, Sinapis arvensis, Matricaria inodora, Stellaria media, Atriplex patula, Anthemis arvensis, Galeopsis tetrahit, Melandrium album, Thlaspi arvense, Sonchus, oleraceus, Amaranthus hybridus, Barbarea vulgaris, Amsinkia intermedia, Fagopyrum tartaricum, Portulaca oleracea, Xanthium spinosum, Alopecurus pratensis, Avenu fatua, Poa annua, Festuca pratensis, Holcus lanatus, Eleusine africana, Digitaria, sanaguinalis, Setaria viridis, Bromus mollis, Echinochloa crusgalli, and Lolium perenne by pre- or post-emergence application.

Similar wettable powders may be prepared by replacing the 5-iodo-2-cyclopropanecarbonamidothiazole by a similar quantity of another thiazole derivative of general Formula I, more particularly 5-bromo-2-cyclopropanecarbonamidothiazole or 5-chloro-2-cyclopropanecarbonamidothiazole.

The thiazole derivatives of general Formula I may be prepared by known methods for the preparation of 2-acylamino-5-halogenothiazoles. By the term "known methods" as used in the present specification is meant methods heretofore used or described in the literature. Suitable methods are, for example, as described by E. Pedley, J. Chem. Soc. 1947, 431, Chem. Abs. 41, 5510a, for the preparation of 2-acetamido-5-chlorothiazole, by G. Travagli, Gazz. Chim. Ital., 78, 592–9 (1948), Chem. Abs. 43, 2616, for the preparation of 2-acetamido-5-iodothiazole and by C. D. Hurd and H. L. Wehrmeister, J. Amer. Chem. Soc. 71, 4007 (1949) for the preparation of 2-acetamido-5-bromo- and 5-iodo-thiazoles. Thus, all the thiazole derivatives of general Formula I may be prepared:

(a) By the halogenation of a 2-acylaminothiazole compound of the general formula:

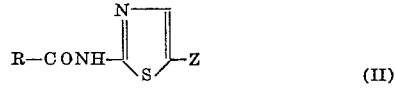

(II)

wherein R is as hereinbefore defined and Z represents a hydrogen atom or a group —HgCl or —HgO·CO·CH₃.

Suitable methods of halogenation include:

(i) when Z represents a hydrogen atom, (a) by chlorination with sulphuryl chloride in a suitable inert organic solvent such as, for example, carbon disulphide, reaction being preferably carried out at the refluxing temperature of the reaction mixture or with molecular chlorine in a suitable inert medium, for example, water or an inert organic solvent such as, for example, carbon disulphide or a chlorinated hydrocarbon, e.g. chloroform, carbon tetrachloride or methylene chloride, reaction being preferably carried out at laboratory temperature, (b) by bromination with molecular bromine in a suitable inert organic solvent such as, for example, carbon disulphide, or a chlorinated hydrocarbon, e.g. chloroform, carbon tetrachloride or methylene chloride, reaction being preferably carried out at laboratory temperature or at the boiling temperature of the solvent, and (c) by iodination with a mixture of sodium or potassium iodide and sodium or potassium iodate in acidic aqueous or aqueous-organic, e.g. aqueous ethanol, media, reaction being preferably carried out with gentle heating or with iodine monochloride in a suitable inert organic solvent, e.g. acetic acid or a chlorinated hydrocarbon.

(ii) When Z represents a group —HgCl or

—Hg·O·CO·CH₃, (a) by chlorination with molecular chlorine in an inert medium such as, for example, water, reaction being preferably carried out at laboratory temperature, (b) by bromination with molecular bromine and an alkali metal bromide such as, for example, sodium bromide, in an inert organic medium such as, for example, methanol, reaction being preferably carried out at laboratory temperature, or (c) by iodination with molecular iodine and an alkali metal iodide such as, for example, potassium iodide, in an inert medium such as, for example, water, reaction being preferably carried out at laboratory temperature or with heating to a temperature up to approximately 100° C.

The compounds of general Formula II wherein Z represents a hydrogen atom may be prepared according to known methods for the preparation of 2-acylaminothiazoles, for example as described by E. Pedley (loc. cit.) for the preparation of 2-acetamidothiazole and by Ueda, Ueda and Toyoshima, Yakugaku Zasshi, 1959, 79, 920- Chem. Abs. 53, 21888c, for the preparation of 2-propionamidothiazole, by reaction of 2-aminothiazole with an acid or functional derivative thereof such as an anhydride, acid halide, ester or thiolester collectively represented by the general formula:

R·CO·Y   (III)

wherein Y represents a halogen atom or a hydroxy, alkoxy or alkylthio group or a group R·CO·O— and R is as hereinbefore defined. The reaction may be effected in the presence or absence of an inert organic solvent, such as an aromatic hydrocarbon, for example, benzene, toluene or xylene, or a ketone, for example acetone, and in the presence or absence of an acid-binding agent such as an alkali metal carbonate, bicarbonate or hydroxide or a tertiary base such as triethylamine, pyridine or quinoline.

Compounds of general Formula II wherein Z represents a group —HgCl or —Hg·CO·CH₃ may be prepared from the corresponding compounds of general Formula II wherein Z represents a hydrogen atom by treatment with mercuric chloride in water, with mercuric acetate in water followed by treatment with an alkali metal chloride, e.g. sodium chloride, to give a compound wherein Z represents —HgCl or with mercuric acetate in acetic acid, if required with heating to a temperature of approximately 100° C.

(b) By the acylation of a 2-amino-5-halogenothiazole of the general formula:

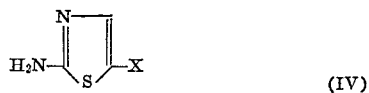

(IV)

By treatment with a compound of general Formula III, reaction being effected as hereinbefore described for the preparation of the compounds of general Formula II.

The 2-amino-5-halogenothiazols of general Formula IV may be prepared from the corresponding 2-acetamido-5-halogenothiazoles by hydrolysis, with dilute aqueous acid, for example as described by E. Pedley (loc. cit.) for the preparation of 2-amino-5-chlorothiazole from 2-acetamido-5-chlorothiazole.

The following examples illustrate the preparation of new compounds of the present invention.

EXAMPLE II

Cyclopropanecarbonyl chloride (prepared according to Cloke et al., J. Amer. Chem. Soc., 1931, 53, 2791) (4.18 g.) was added dropwise over a period of 40 minutes to a stirred solution of 2-amino-5-chlorothiazole (prepared according to E. Pedley, loc. cit.) (5.38 g.) in pyridine (4 ml.) and anhydrous acetone (100 ml.), the temperature being maintained at +5° C. by means of an ice-bath. When the addition was complete, the reaction mixture was heated under reflux for 1 hour, cooled and the acetone removed under reduced pressure at a temperature not exceeding 40° C. The residue obtained was then triturated with water (200 ml.), filtered off, washed with water (500 ml.) and recrystallized twice from a mixture of water (50 ml.) and ethanol (150 ml.) to give 5-chloro-2-cyclopropanecarbonamidothiazole (5.73 g.) in the form of white needles, M.P. 208–210° C.

EXAMPLE III 2-cyclopropanecarbonamidothiazole (10.8 g.) was dissolved in the minimum quantity of boiling water (900 ml.) and mercuric acetate (19.0 g.) added in one portion to the hot solution. The mixture was heated on a steam bath for 30 minutes with stirring. Saturated aqueous sodium chloride solution (200 ml.) was then added and the mixture cooled and filtered. The solid was washed successively with water (500 ml.), methanol (500 ml.), and acetone (500 ml.), and dried to give 5-chloromercuri-2-cyclopropanecarbonamidothiazole (23.82 g.), M.P. >300° C.

5 - chloromercuri - 2 - cyclopropanecarbonamidothiazole (23.83 g.) was powdered and suspended in water (500 ml.) containing iodine (13.2 g.) and potassium iodide (14.0 g.) and the mixture heated at 100° C. with stirring for 6 hours. After cooling, the precipitated solid was collected, washed with saturated aqueous sodium thiosulphate solution (30 ml.) and recrystallized twice from the minimum quantity of methanol to give 5-iodo-2-cyclopropanecarbonamidothiazole (11.31 g.) in the form of pinkish-white needles, M.P. 223–225° C.

2-cyclopropanecarbonamidothiazole (4.16 g.), M.P. 163–166° C., as used in the above preparation was obtained by the procedure described in Example II for the preparation of 5-chloro-2-cyclopropanecarbonamidothiazole by replacing the 2-amino-5-chlorothiazole by 2-aminothiazole (4.00 g.).

EXAMPLE IV

Bromine (8 g.) was added dropwise over half an hour to a solution of 2-cyclopropanecarbonamidothiazole (8.4 g.) in anhydrous chloroform (50 ml.), the temperature being maintained at 5° C. to 10° C. by means of an ice-bath. The mixture was then heated under reflux for 2 hours, allowed to stand overnight and the chloroform evaporated on a steam bath. The solid residue was triturated with saturated aqueous sodium thiosulphate solution (30 ml.), filtered off and recrystallized twice from the minimum quantity of methanol to give 5-bromo-2-cyclopropanecarbonamidothiazole (7.52 g.) in the form of white needles, M.P. 216–218° C.

EXAMPLE V

Chlorine was passed for about 1 hour into a stirred suspension of iodine (560 g.) in glacial acetic acid (3 litres) until the original weight had increased by 157 g. During this time the colour of the solution changed from brown to deep red and the violet colour of the vapour over the liquid was discharged. The solution of iodine monochloride thus obtained was then run slowly over one and three-quarter hours into a stirred suspension of 2-cyclopropanecarbonamidothiazole (672 g.) in glacial acetic acid (3 litres). During the addition, the temperature rose from 17° C. to 27° C. On complete addition, the mixture was stirred for a further four and a half hours, and then allowed to stand at laboratory temperature for two days, during which time some solid was precipitated.

The mixture was treated with anhydrous sodium acetate (500 g.) and stirred for 15 minutes, after which time a 20% w./v. aqueous solution of sodium bisulphite was added until a starch test was negative. Water was added to make the total volume 10 litres, the mixture stirred for 15 minutes and filtered. The precipitate, a buff-coloured solid, was washed with water, then re-suspended in water, stirred well, and filtered. The precipitate was dried at 60° C. to give 5-iodo-2-cyclopropanecarbonamidothiazole (900 g.), M.P. 215–218° C.

EXAMPLE VI

A solution of potassium iodide (4.2 g.), potassium iodate (2.7 g.) and water (75 ml.) was stirred and maintained at 55–60° C. during the dropwise addition over 15 minutes of a solution of 2-1′-methylcyclopropanecarbonamidothiazole (5.5 g.) in concentrated sulphuric acid (10.8 g.), water (33 ml.) and ethanol (30 ml.). An insoluble oil was precipitated and this was redissolved by the addition over 40 minutes of ethanol (80 ml.). The mixture was cooled and treated with sodium metabisulphite until free iodine was no longer available. The precipitate was filtered off, and the filtrate evaporated. The residue and the precipitate were combined and recrystallized from a mixture of ethanol (25 ml.) and water (20 ml.). The purified product was recrystallized a second time from petroleum ether (60 ml.; B.P. 100–120° C.) to give a 2-1′-methylcyclopropanecarbonamido-5-iodothiazole (3.5 g.), M.P. 120–121° C.

The 2-1′-methylcyclopropanecarbonamidothiazole used as starting material in the above preparation was prepared as follows:

A solution of 2-aminothiazole (5 g.) and triethylamine (5 g.) in acetone (20 ml.) was stirred and cooled in ice during the addition of 1-methylcyclopropanecarbonyl chloride (5.9 g.; prepared according to Hughes and Roberts, J. Chem. Soc., 1960, 905). On complete addition, the mixture was allowed to stand at laboratory temperature overnight, and then filtered to eliminate triethylamine hydrochloride. The filtrate was evaporated under reduced pressure, keeping the temperature below 40° C., and the residual sticky white solid was triturated, first with 2 N acetic acid, and then with water, to give 2-1′-methylcyclopropanecarbonamidothiazole (7.4 g.), M.P. 97–99° C.

EXAMPLE VII

A solution of 1-methylcyclopropanecarbonyl chloride (2.9 g.) in acetone (5 ml.) was added dropwise to a stirred mixture of 2-amino-5-chlorothiazole (3.36 g.), triethylamine (2.52 g.) and acetone (15 ml.). The mixture was allowed to stand overnight at laboratory temperature and then filtered to remove triethylamine hydrochloride. The filtrate was evaporated under reduced pressure, keeping the temperature below 40° C., and the residue triturated with water, dried and recrystallized from n-hexane (70 ml.) to give 2-1′-methylcyclopropanecarbonamido-5-chlorothiazole (1.6 g.), M.P. 120° C.

EXAMPLE VIII

A solution of 1-methylcyclopropanecarbonyl chloride (2.9 g.) in acetone (5 ml.) was added dropwise to an ice-cold, stirred mixture of 2-amino-5-bromothiazole (4.9 g.; prepared according to English, Clarke, Clapp, Seeger and Ebel, J. Amer. Chem. Soc., 1946, 68, 457), trimethylamine (2.52 g.) and acetone (20 ml.). On complete addition, the mixture was allowed to stand overnight at laboratory temperature and then filtered. The filtrate was evaporated under reduced pressure and the residual solid triturated with water. Recrystallization from n-hexane (200 ml.) gave 2-1′-methylclopropanecarbonamide-5-bromothiazole (3 g.), M.P. 126–128° C.

EXAMPLE IX

A solution of bromine (5.9 g.) in chloroform (10 ml.) was added dropwise over 10 minutes to a stirred solution of 2-1′-methylcyclopropanecarbonamidothiazole (6.7 g.) in chloroform (15 ml.). On complete addition of the bromine, the mixture was refluxed for 30 minutes, and then allowed to cool. A solid precipitate was filtered off, and triturated with water to give 2-1′-methylcyclopropanecarbonamido-5-bromothiazole (3.7 g.), M.P. 126–128° C., undepressed by admixture with a sample prepared as in Example VIII.

EXAMPLE X

A solution of potassium iodide (2.32 g.) and potassium iodate (1.46 g.) dissolved in water (45 ml.) was treated at 55° C. by dropwise addition with a solution of 2-1′-methoxycyclopropanecarbonamidothiazole (3.2 g.) dissolved in ethanol (20 ml.), concentrated sulphuric acid (3.2 ml.) and water (18 ml.). A further quantity of ethanol (50 ml.) was added to the reaction mixture during the addition. The mixture was filtered to give a yellow solid precipitate. The filtrate was evaporated to dryness and the residue recrystallized from aqueous ethanol. This recrystallized material was combined with the yellow solid precipitate obtained above, and recrystallized successively from aqueous ethanol and ethanol to give 2-1′-methoxycyclopropanecarbonamido-5-iodothiazole (0.9 g.), M.P. 146–148° C.

The 2-1′-methoxycyclopropanecarbonamidothiazole used as starting material in the above preparation was prepared as follows:

A mixture of sodium methoxide (prepared from 2.8 g. sodium) in dry benzene (80 ml.) was stirred and treated with methyl 1-methoxycyclopropane carboxylate (6.5 g.; prepared according to U.S. Patent No. 3,201,466) and 2-aminothiazole (5.6 g.). The mixture was heated and stirred for 9 hours, during which time a benzene-methanol azeotrope was removed slowly, the volume being maintained by the addition of further quantities of dry benzene. The mixture was cooled and filtered to give a light brown precipitate which was dissolved in distilled water (200 ml.), and treated with decolourising charcoal. The mixture was filtered and acidified with dilute acetic acid to give a precipitate of 2-1′-methoxycyclopropanecarbonamidothiazole (5.5 g.), M.P. 155–158° C.

We claim:
1. Thiazole derivatives of the formula:

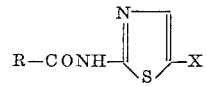

wherein R represents cyclopropyl and X represents chlorine, bromine or iodine.

2. 5-chloro-2-cyclopropanecarbonamidothiazole.
3. 5-bromo-2-cyclopropanecarbonamidothiazole.
4. 5-iodo-2-cyclopropanecarbonamidothiazole.

References Cited

UNITED STATES PATENTS

| | | | |
|---|---|---|---|
| 3,002,024 | 9/1961 | Blomquist | 260—515 |
| 3,215,727 | 11/1965 | Turk et al. | 260—520 |
| 3,277,107 | 10/1966 | Neighbors | 260—306.8 |
| 3,374,082 | 3/1968 | Lemin | 260—306.8 |

ALTON D. ROLLINS, Primary Examiner

U.S. Cl. X.R.

71—90; 260—299, 455, 468, 514, 544, 546